US008473785B2

(12) United States Patent
Liu et al.

(10) Patent No.: US 8,473,785 B2
(45) Date of Patent: Jun. 25, 2013

(54) COMPUTATIONALLY EFFICIENT TIERED INFERENCE FOR MULTIPLE FAULT DIAGNOSIS

(75) Inventors: Juan Liu, Milipitas, CA (US); Johan de Kleer, Los Altos, CA (US); Lukas D. Kuhn, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 905 days.

(21) Appl. No.: 12/610,700

(22) Filed: Nov. 2, 2009

(65) Prior Publication Data

US 2010/0306587 A1 Dec. 2, 2010

Related U.S. Application Data

(60) Provisional application No. 61/183,435, filed on Jun. 2, 2009.

(51) Int. Cl.
*G06F 11/00* (2006.01)
(52) U.S. Cl.
USPC .................................. 714/26; 714/25; 714/48
(58) Field of Classification Search
USPC .......................................... 714/26, 48, 25, 11
See application file for complete search history.

(56) References Cited

U.S. PATENT DOCUMENTS

| 6,289,471 | B1 * | 9/2001 | Gordon ......................... 714/6.12 |
| 2005/0172175 | A1 * | 8/2005 | Bhat et al. ....................... 714/43 |
| 2007/0294596 | A1 * | 12/2007 | Gissel et al. .................... 714/48 |
| 2008/0126859 | A1 * | 5/2008 | Guo et al. ....................... 714/25 |
| 2008/0148099 | A1 * | 6/2008 | Bhat et al. ...................... 714/25 |

OTHER PUBLICATIONS

Kuhn, Lukas, et al., "Online-Based Diagnosis for Multiple, Intermittent and Interaction Faults", Annual Conference of the Prognostics and Health Management Society, Sep. 27-Oct. 1, 2009, pp. 1-9; also, Qualitative Reasoning Workshop (QR 2008), Boulder, CO, 2008.
Kuhn, Lukas, et al., "Online-Based Diagnosis of Production Systems"(also referred to as, "An Integrated Approach to Qualitative Model-Based Diagnosis"), Association for the Advancement of Artificial Intelligence, 2008, pp. 1-5; also, Qualitative Reasoning Workshop (QR 2008), Boulder, CO, 2008.
De Kleer, Johan, et al., "Diagnosing Multiple Faults", this paper (18 pgs.) is a correction (as of Apr. 25, 2008) of paper first appearing in Artificial Intelligence 32 (1987), pp. 97-130.
De Kleer, Johan, "Diagnosing Intermittent Faults", Proceedings of the 18th International Workshop on Principles of Diagnosis (DX-07), Nashville, TN, US, May 2007.

* cited by examiner

*Primary Examiner* — Sarai Butler
(74) *Attorney, Agent, or Firm* — Fay Sharpe LLP (57) ABSTRACT

A computer based method and system for tiered inference multiple fault diagnosis is provided. The method includes using a computer processor to dissect a hypothesis space representing a production system having a plurality of production modules into tiers. Production modules in the current tier are partitioned into a group or a set of sub-groups. A fault diagnosis algorithm is applied to the group of each sub-group to identify an acceptable fault diagnosis. When no acceptable fault diagnosis is found, the process moves to the next tier to perform further investigations. The process continues to move to higher tiers until an acceptable fault diagnosis is obtained or the system instructs the process to end.

24 Claims, 7 Drawing Sheets

COMPUTATIONALLY EFFICIENT TIERED INFERENCE FOR MULTIPLE FAULT DIAGNOSIS

PRIORITY CLAIM

This application claims the priority benefit under Title 35, United States Code, §119, of Provisional Application No. 61/183,435, filed Jun. 2, 2009, entitled "Computationally Efficient Tiered Inference For Multiple Fault Diagnosis", by Juan Liu et al.

INCORPORATION BY REFERENCE

This is a non-provisional application of U.S. Provisional Application Ser. No. 61/183,435, filed Jun. 2, 2009, entitled "Computationally Efficient Tiered Inference For Multiple Fault Diagnosis", by Juan Liu et al., the disclosure of which is hereby incorporated by reference in its entirety.

BACKGROUND

The present exemplary embodiments are directed to fault diagnosis and more particularly to multiple fault diagnosis. Troubleshooting a practical system to isolate broken components can be difficult, as the number of fault combinations grows exponentially with the number of components. Qualitative reasoning proposed the idea of starting from simple fault assumptions for computationally efficient diagnosis, and escalating to more complicated faulty assumptions when necessary. It may be desirable to extend this idea from qualitative reasoning to quantitative reasoning. However, an issue is whether it is possible to apply statistical inference, which is precise but computationally intense, in a computationally efficient manner.

BRIEF DESCRIPTION

A computer based method and system for tiered inference multiple fault diagnosis is provided. The method includes using a computer processor to dissect a hypothesis space representing a production system having a plurality of production modules into tiers. Production modules in the current tier are partitioned into a group or a set of sub-groups. A fault diagnosis algorithm is applied to the group of each sub-group to identify an acceptable fault diagnosis. When no acceptable fault diagnosis is found, the process moves to the next tier to perform further investigations. The process continues to move to higher tiers until an acceptable fault diagnosis is obtained or the system instructs the process to end.

DETAILED DESCRIPTION

Aspects of the present exemplary embodiment relate to a system and method for tiered inference for multiple fault diagnosis with respect to multiple-component production systems. Generally, diagnosing multiple-component systems is difficult and computationally expensive, as the number of fault hypotheses grows exponentially with the number of components in the system. The present exemplary embodiment describes an efficient framework for statistical diagnosis including: (1) structuring fault hypotheses into tiers, starting from low cardinality fault assumptions (e.g., single fault) and gradually escalating to higher cardinality (e.g., double faults, triple faults) when necessary; (2) at each tier, dynamically partitioning the overall system into subsystems, within which there is likely to be a single fault. The partition is based on correlation between the system components and is dynamic. Therefore, when a particular partition is ruled out, a new one is constructed based on the latest observations from the production system. When no viable partition remains, the search proceeds to the next tier. This approach enables, at the subsystem level, the use of single-fault diagnosis, which has only linear complexity, thereby avoiding exponential hypothesis explosion. The concepts and implementation have been demonstrated via examples and simulation. A performance analysis shows that for practical systems where most components are functioning properly, the proposed scheme achieves a desirable tradeoff between computational cost and diagnosis accuracy.

Statistical inference is now widely adopted in diagnostic systems. The basic idea is to evaluate hypotheses (e.g., fault combinations) based on their probability given some observation data. Mathematically, for any hypothesis in the hypotheses space $\chi$, the probability for the hypothesis is updated via the Bayes rule:

$$p(x|o) = \alpha p(o|x) p(x) \qquad \text{Eqn. (1)},$$

where $p(x)$ is the initial probability (prior) for the hypothesis x, $p(o|x)$ is the likelihood probability of observing O given that x is true, and $\alpha$ is the normalization factor to let $p(x|o)$ sum up to 1. The resulting $p(x|o)$ is the posterior probability that x is true given the observation O. The diagnosis that best explains the data is the maximum a posterior (MAP) estimate:

$$x_{MAP} = \operatorname*{argmax}_{x \in \chi} p(x | o) \qquad \text{Eqn. (2)}$$

While Bayesian updates offer a coherent and quantitative way of incorporating observation data, it faces the same requirement to search through all hypotheses in $\chi$. In practice, a system with M components (e.g., modules in a production environment) has the hypothesis space:

$$\chi = \{000000, 000001, \ldots, 111111\}$$

Each hypothesis $x \in \chi$ is a bit vector, where the i-th bit is an indicator of whether the i-th component has fault (0 for not having fault, 1 for having fault). The computational complexity of the Bayesian update is $O(2^M)$. When M is large, the update is prohibitively expensive.

To mitigate the computational difficulty identified above, the present disclosure proposes two concepts. The first is tiered inference, in which the basic idea is to organize the hypothesis space $\chi$ into tiers with each successive tier increasing in fault cardinality. Inference is restricted to lower tiers (i.e., those with fewer defective modules) until the lower tiers have been ruled out by the observation data. The second concept is a divide-and-conquer strategy that partitions system components (e.g., modules) into single-fault subsystems. This partitioning utilizes single-fault diagnosis, which has only linear complexity, to diagnose a multiple-fault system.

Figure 1:
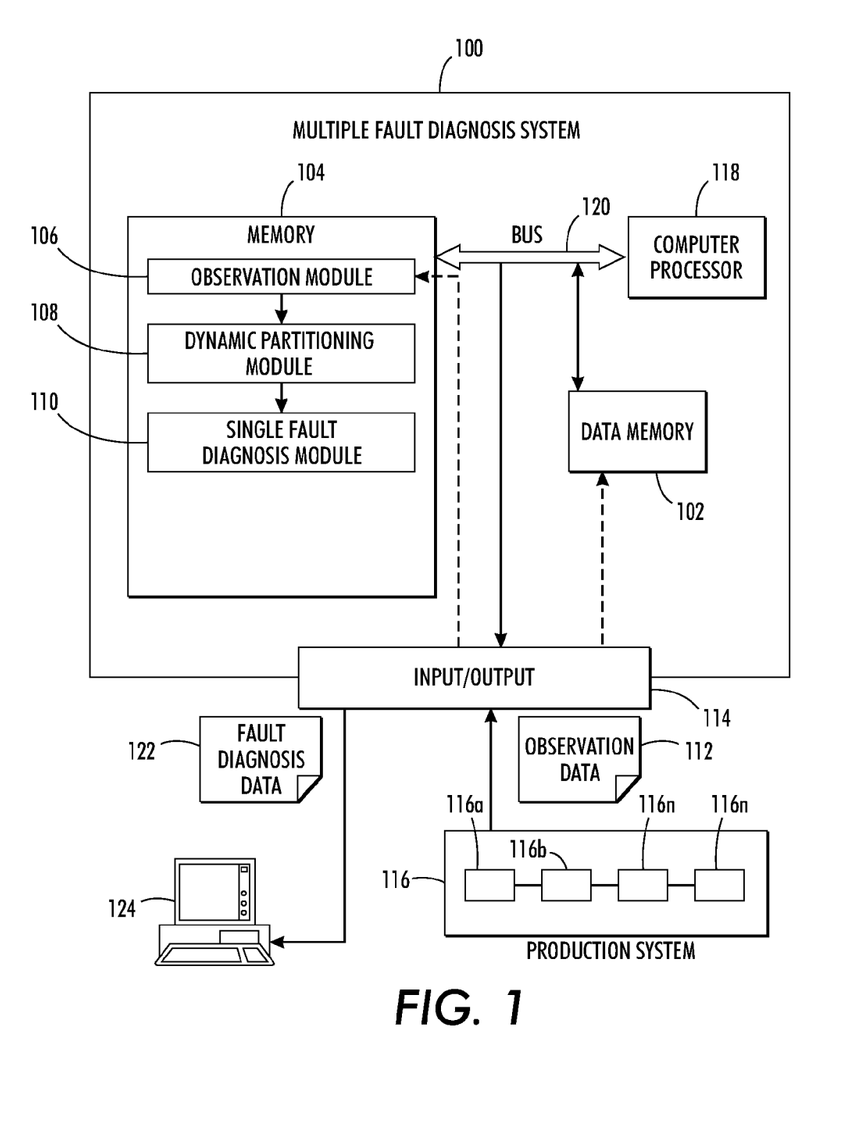
FIG. 1 is a high-level overview of an exemplary system for tiered inference for multiple fault diagnosis; included in the system is an observation module, dynamic partitioning module, and a single fault diagnosis module.

With reference now to FIG. 1, an exemplary tiered inference multiple fault diagnosis system 100 which implements these concepts is described. System 100 includes data memory block 102 for use during processing of data. Main memory 104 of system 100 stores an observation module 106, dynamic partitioning module 108, and a single fault diagnosis module 110. The observation module 106 receives observation data 112 from the input/output device 114 (described in greater detail below) that pertain to production system 116 itself. Observation data 112 is used by observation module 106 to create updated "beliefs" about production system 116. Beliefs are assumptions about a production system based on observation data received from production system 116 itself. In FIG. 1, production system 116 is shown to have a plurality of components or modules 116a, 116b, 116c, 116n.

Dynamic partitioning module 108 partitions the set of hypotheses (which represent components or modules 116a-116n of the production system 116) in a current tier such that each partition is likely to have, at most, one fault. The single fault diagnosis module 110 processes the partitions using the current belief to determine whether each partition is likely to have a single fault.

The observation module 106, dynamic partitioning module 108, and single fault diagnosis module 110 may be implemented as hardware or software or a combination thereof. In one embodiment, the components 106, 108, and 110 comprise software instructions stored in main memory 104, which are executed by a computer processor 118. The processor 118, such as a computer's CPU, may control the overall operation of the computer system by execution of processing instructions stored in memory 104. Components 106, 108, and 110 of the system 100 may be connected by a data control bus 120.

The system 100 includes an input/output device 114, which outputs processed data, such as fault diagnosis data 122 to one or more devices, such as client terminal 124. The fault diagnosis data 122 could also be output to other devices such as RAM, ROM, network devices, printing systems, etc. The input/output device 114 also receives observation data 112 from the production system 116 and forwards this information to the observation module 106 in main memory 104.

As will be appreciated, the tiered inference multiple fault diagnosis system 100 may comprise one or more computing devices, such as a personal computer, PDA, laptop computer, server computer, or combination thereof. Memories 102, 104 may be integral or separate and may represent any type of computer readable medium such as random access memory (RAM), read only memory (ROM), magnetic disk or tape, optical disk, flash memory, or holographic memory. In one embodiment, the memories 102, 104 comprise a combination of random access memory and read only memory. In some embodiments, the processor 118 and memory 102 and/or 104 may be combined in a single chip.

Figure 2:
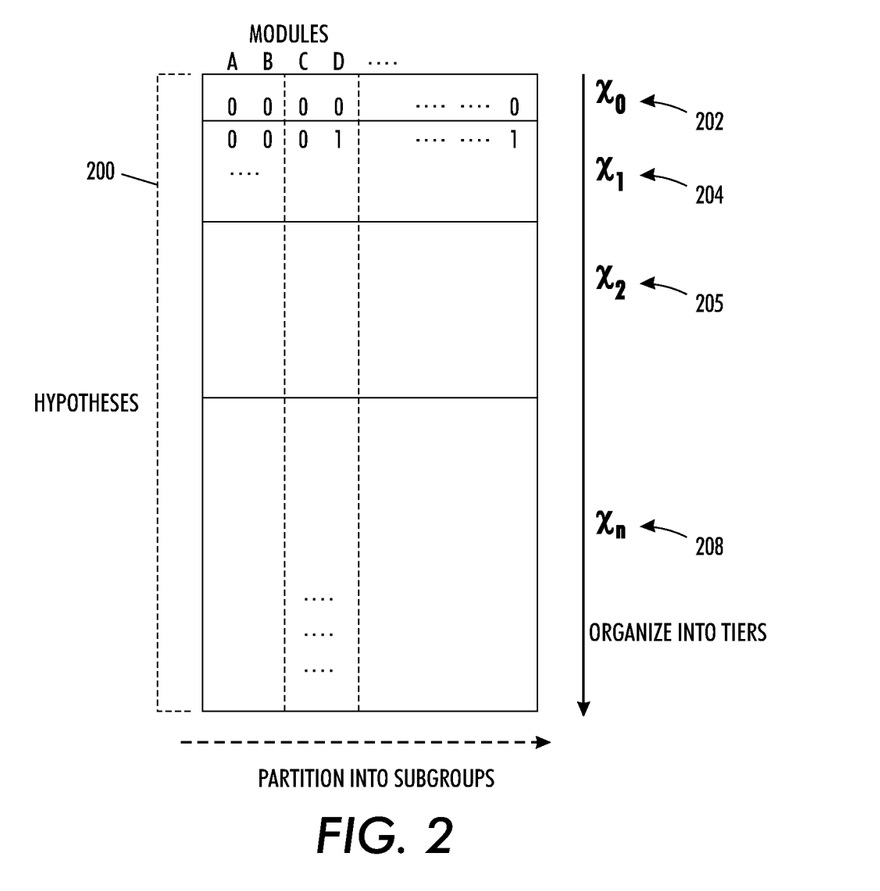
FIG. 2 illustrates the division of a set of hypotheses into tiers, based on the cardinality of the hypotheses.

FIG. 2 illustrates concepts of structuring a set of fault hypotheses into tiers. The hypothesis space $\chi$ is represented as a matrix 200, with columns representing components, and rows representing the different fault assumptions. Organizing hypotheses into tiers is shown as dividing the hypothesis into vertically stacked blocks. Inference starts from the top block (i.e., no-fault tier $\chi_0$), 202, and progresses down to single-fault tier $\chi_1$, 204, then to the double-fault tier $\chi_2$ 206, and so onto final tier $\chi_n$, 208. Also shown is the idea of organizing production system components or modules into subgroups, where each subgroup (or subsystem) is likely to have one, and only one, fault. For example, the system of FIG. 2 contains four modules or components (A, B, C, D), where any subgroup of these modules can form a subsystem. In the exemplary embodiment of FIG. 2, the set of modules AB form a subsystem, and modules CD form a subsystem. These subsystems form partitions in FIG. 2.

While the concept of partitioning a multiple-fault system into single-fault subsystems is a useful concept, how to accomplish the partitioning is a difficult problem. In this embodiment, partitioning the multiple-fault system into single-fault subsystems uses a best-effort approach. Particularly, given the posterior belief $\{p(x)\}$, a partition is sought which results in subsystems that are single-fault with maximum probability. As will be discussed in greater detail in connection with FIG. 7 it is considered in one embodiment that a computationally efficient greedy algorithm is used that is based on the intuition that modules within a subsystem must be negatively correlated so that the total number of faults remains constant (e.g., single-fault).

Many diagnosis approaches have taken advantage of the hierarchical structure of the system being diagnosed. However, they depend on one single decomposition determined a priori. The approach of the present embodiment is quite different in that it dynamically constructs and modifies the decomposition as diagnosis proceeds and is complementary to these fixed approaches.

1. Tiered Inference

A specific idea of tiered inference is to restrict posterior computation to a subset of hypotheses, and broaden the scope of inference only when necessary. In the tiered inference framework, the overall hypothesis space is partitioned or dissected into tiers, i.e., $$\chi = \chi_0 \cup \chi_1 \cup \chi_2 \cup \ldots \cup \chi_M, \quad \text{Eqn. (3)}$$

where each tier $\chi_j$ is defined as the collection of hypotheses assuming a total of j faults in the system, i.e., hypotheses with cardinality j ($\Sigma_i x_i = j$). Once the system is observed to be malfunctioning, the need for diagnosis arises. Inference starts with the single-fault tier $\chi_1$, assuming that the system has only one fault. At this tier, the inference only updates the posterior for the hypotheses in $\chi_1$ and ignores all other hypotheses. This drastically reduces the computational complexity from $O(2^M)$ to $O(M)$, where $O(\ )$ is standard complexity notation, meaning "in the order of". However, the single-fault assumption is an approximation, as the system can have multiple faults. When a conflict is detected, i.e., all the hypotheses $\chi_1$ in conflict with the observation data, the inference is escalated to the next tier $\chi_2$, which assumes a total of two faults in the system. The inference then updates all hypotheses in $\chi_2$ using the latest observation data. The process repeats until observation data or the hypothesis space is exhausted.

Figure 3:
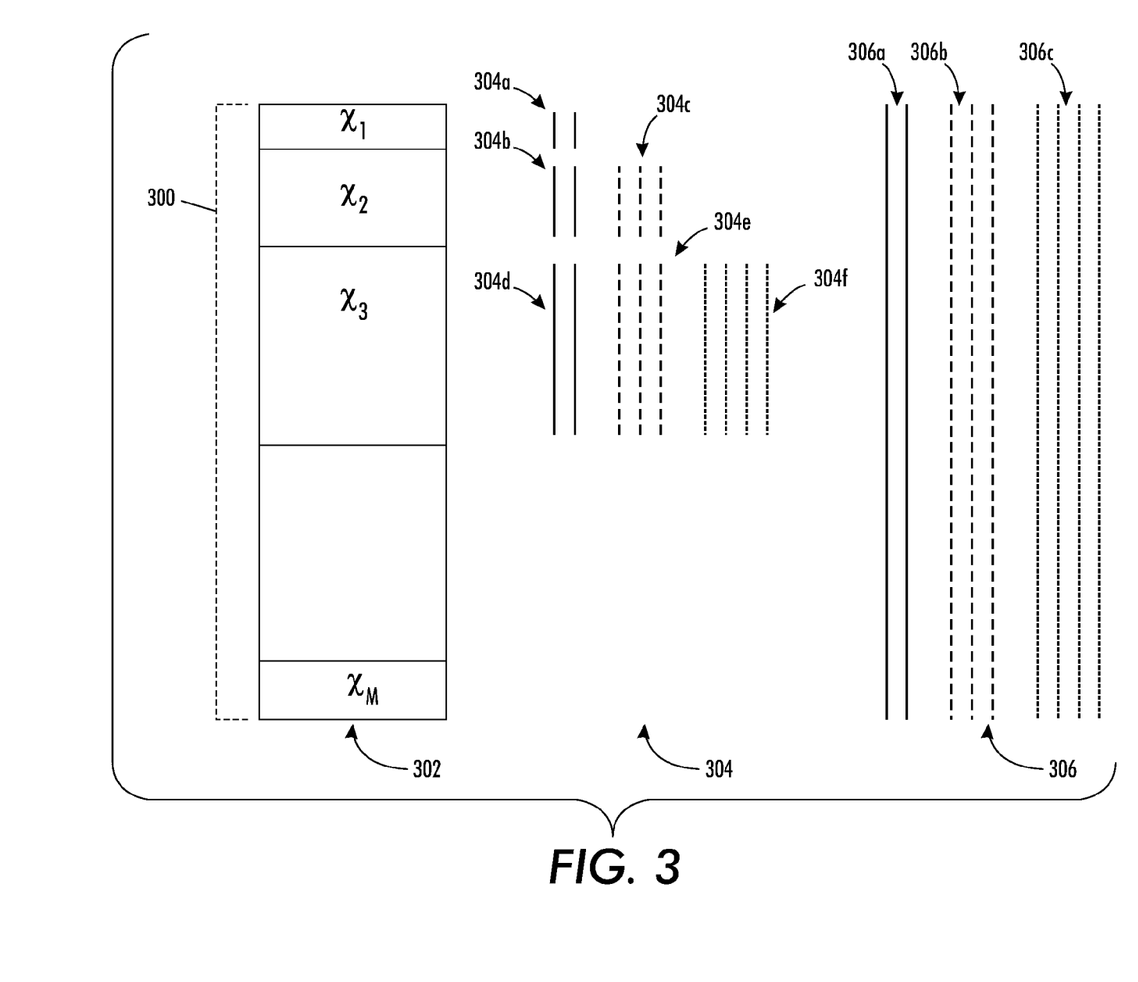
FIG. 3 illustrates the processing power required to process each hypothesis tier versus a brute force algorithm that processes the entire space of hypotheses.

With reference to FIG. 3, the computation structure of the tiered inference framework is shown. The hypothesis space $\chi$ 300 (similar to 200 of FIG. 2) is partitioned into non-overlapping tiers $\chi_1, \chi_2, \chi_3, \ldots, \chi_M$, 302. The middle column 304 shows the computation requirement for the tiered inference algorithm. Based on this arrangement, a sequence of observations are considered as follows:

(1) The first batch of observations is used to update all hypotheses in $\chi_1$, hence the computation is linear in $|\chi_1|$. In column 304, this is shown as vertical solid lines 304a in the first tier. The length of the lines symbolizes the amount of computation, in this case proportional to the size of $\chi_1$.

(2) The last observation of the first batch rules out all hypotheses in $\chi_1$. In this case, the process is forced to escalate to tier $\chi_2$. The observations now need to be re-applied to each hypothesis in $\chi_2$. This corresponds to the solid lines 304b in the second tier. The computation is linear in $|\chi_2|$.

(3) The second batch of observations is applied to all hypotheses in $\chi_2$. The computation is shown as the dashed lines 304c in the second tier.

(4) The last observation of the second batch further rules out all hypotheses in $\chi_2$. Now, the algorithm escalates to $\chi_3$ and re-applies all the previous observations (i.e., solid lines 304d and dashed lines 304e in the third tier). As more observations are accumulated, the update computation (dotted lines 304f in the figure) is restricted to $\chi_3$.

In contrast, the third column 306 shows the computation where all observations are applied to all hypotheses (i.e., solid lines 306a, dashed lines 306b and dotted lines 306c). Notice that the total vertical lines (i.e., 304a-304f) in column 304 are much shorter than the vertical lines (306a-306c) in column 306. The computational savings are clear, and are primarily due to the fact that the higher tier hypotheses are not updated until necessary.

An issue to consider when using this tiered inference framework, is the price that is paid in return for the inference computational savings. It is noted that this estimation is an approximation—the higher tiers are ignored when the lower tiers remain consistent with the observations, and therefore tiered inference loses optimality. For instance, the maximum a posterior (MAP) diagnosis is only optimal within the tiers that had been worked on, so it is not possible to claim optimality in the overall hypothesis space. Also, the tiered inference framework needs to store all past observations. In the case where the current tier is ruled out, the past observations will be re-applied to the new tier. This means that the system needs to have sufficient memory to accommodate the storage of all observations for an indefinite period of time.

Thus, in a situation where the computation is done sequentially each time a new observation is made, the memory storage requirement for updating the entire hypothesis space is $2^M$, as only the posterior probabilities need to be stored, and the observation itself does not need to be stored. In contrast, the memory requirement for the tiered inference method is $|\chi_j|+O(|observations|)$ (i.e., the probability of all hypotheses in the current tier need to be stored, as well as all observations in the past). Therefore, when the observation history is long, the memory requirement is high. In essence, the tiered inference framework reduces the burden on computation, but shifts the burden to memory storage. In practice, the observation history may be compressed into an aggregated form, thereby saving memory.

In practical systems, most modules are likely to be good, and the total number of faults is likely to be small. In this case, the single-fault tier can be much more probable than the double-fault tier, and even more so than the triple-fault tier, and so on. Hence it makes sense to focus computational resources to the single-fault tier, and escalate to the higher tiers only when necessary. The higher tier hypotheses are safely ignored because they have minimal probability to start with. Employing this concept results in large computational savings. On the other hand, a pathological case would be the situation where each module has a high (close to 1) probability of having fault. From the computational point of view, starting from the low cardinality tiers is less attractive, since the low cardinality hypotheses are likely to be ruled out by the observations, and the reduction in inference computation is less significant. Furthermore, the tiered inference framework will incur an overhead cost of defining the next subset or tier of hypotheses to work on every time an existing tier is ruled out. This overhead cost will be high in this pathological case, making the tiered inference framework less attractive. On the flip side, this pathological case is rare.

2. Partitioning into Single-Fault Subsystems

Diagnosing a single-fault is computationally efficient. If a M-module system is assumed or known to have a single-fault, only M hypotheses need to be compared, rather than the $2^M$ hypotheses in the multi-fault case. Given that single-fault inference is computationally efficient, is useful to apply this technique whenever applicable.

The tiered inference concepts of the previous section suggest that single-fault diagnosis can be used in the first tier $\chi_1$ until an observation data conflict arises. With reference to 400 of FIG. 4, a simple example system with only four modules (ABCD) is shown. Column 402 arranges the hypotheses based on their cardinality. This defines the tiers $\chi_0, \chi_1, \chi_2$, and so on. In the tiered inference framework, the process starts from $\chi_0$ and $\chi_1$. When the observation data suggests that the system (ABCD) has more than one fault, the tiered inference escalates to the double-fault tier, $\chi_2 \triangleq \{x:\Sigma_i x_i=2\}$, as shown in column 402. At this point, it is known that the overall system (ABCD) has at least two faults, but it is possible that subsystems, for instance (AB) and (CD), each has a single fault. In this case, single-fault diagnosis is applied to subsystems (AB) and (CD) separately to isolate the faults. The computation is still efficient. With this partition, the update is restricted to hypotheses from the subset $\chi'=\{x|x_A+x_B \leq 1, x_C+x_D \leq 1\}$, shown as the hypotheses marked with checkmarks in the top box 404a of column 404. The computation is restricted to $\chi_t$, and hence is fast.

The process is now directed to seeking a good partitioning such that the partitioned subsystems are most likely be single-fault subsystems. Formally, the partitioning problem is as follows: given an overall system S containing modules, the partitioning divides S into two groups $S_1$ and $S_2$ such that $S_1 \cup S_2 = S$ and $S_1 \cap S_2 = \emptyset$. For instance, in the example in FIG. 4, $S_1=(AB)$ and $S_2=(CD)$ is a valid partition. It is noted this partitioning is, however, not unique. For example, modules (ABCD) can be partitioned into $\{(AB), (CD)\}$ (represented by the top box 406a of column 406), or $\{(AD), (BC)\}$ (represented by the second box 406b of column 406) or other combinations. A specific idea of finding a useful partition is to examine the correlation between system components to find those subsets which collectively contain only a single fault with maximum probability. It is to be noted in this description and figures a bracket is used to denote a group within which there is believed to be only single-faults, and the curly bracket is for a collection of groups or sub-groups.

Given a subsystem partition and the corresponding subset of hypotheses $\chi'$, assuming at most a single fault within each subsystem, the process restricts the posterior updates to the subset, until the observation data conflicts with $\chi'$. In this case, the process backtracks to the existing tier $\chi_2$ and finds a more suitable partition. When the whole tier $\chi_2$ is ruled out by observation, the process escalates to the third tier $\chi_3$ (the collection of hypotheses with three fault modules) and partitions the overall system into three subsystems, each of which hopefully contains a single fault. The whole process repeats as more observations are made.

In general, a tier $\chi_j$ has a size of $$C_M^j = \frac{M \cdot (M-1) \ldots (M-j+1)}{j!}.$$

If a tier is partitioned into j subsystems, the size of the hypothesis subset is roughly in the order of $$\left(\frac{M}{j}\right)^j.$$

This is a constant factor reduction by a factor of roughly $(j)=j^j/j!$.

3. How To Partition

Initially, a criteria for partitioning will be discussed. It is appreciate there are many ways of partitioning a system into sub-groups (or subsystems). For example, (ABCD) can be partitioned into $C_4^1 + C_4^2/2 = 7$ ways. The issue, however, is how to find the most preferable portions using the optimal criteria to make sure that the single-fault assumption for each subsystem is has a maximal probability.

A criterion employed in this disclosure is that the process favor the partition (e.g., of the module set) which captures maximal probability mass, i.e., maximizing the probability $\Sigma x \epsilon x^r p(x)$.

Figure 4:
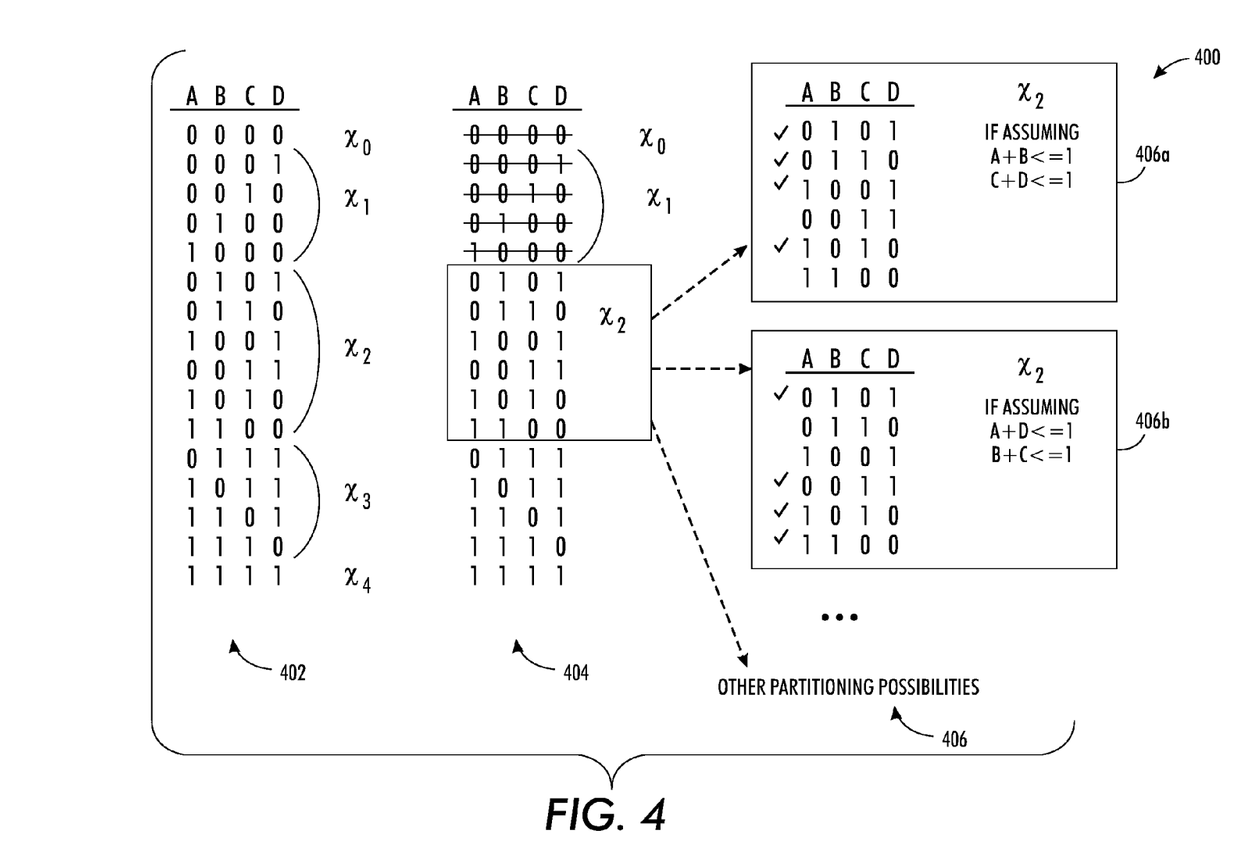
FIG. 4 illustrates an example partition of sub-groups determined by the dynamic partitioning algorithm.

For instance, in FIG. 4, partitioning into subsystems {(AB), (CD)}, shown as the top block 406a on the right hand side, captures hypotheses {0101, 0110, 1001, 1010} (see block $\chi_2$ of 404). There are two hypotheses {0011, 1100} that violate the single-fault assumption in (CD) and (AB) respectively. Particularly, 1100 shows two faults in (AB) while 0011 shows two faults in (CD). If the probabilities p(0011) and p(1100) are small, this means (AB) and (CD) are likely to have single-fault, and the partition is advantageous. On the other hand, if p(0011) and p(1100) are big, this means the single-fault subsystem assumption is questionable. To compare the two partitions {(AB), (CD)} and {(AC), (BD)}, only the probability mass of missed hypotheses need to be compared, in this case, p(0011)+p(1100) and p(0110)+p(1001). The partition with a lower probability mass is more favorable.

Figure 5:
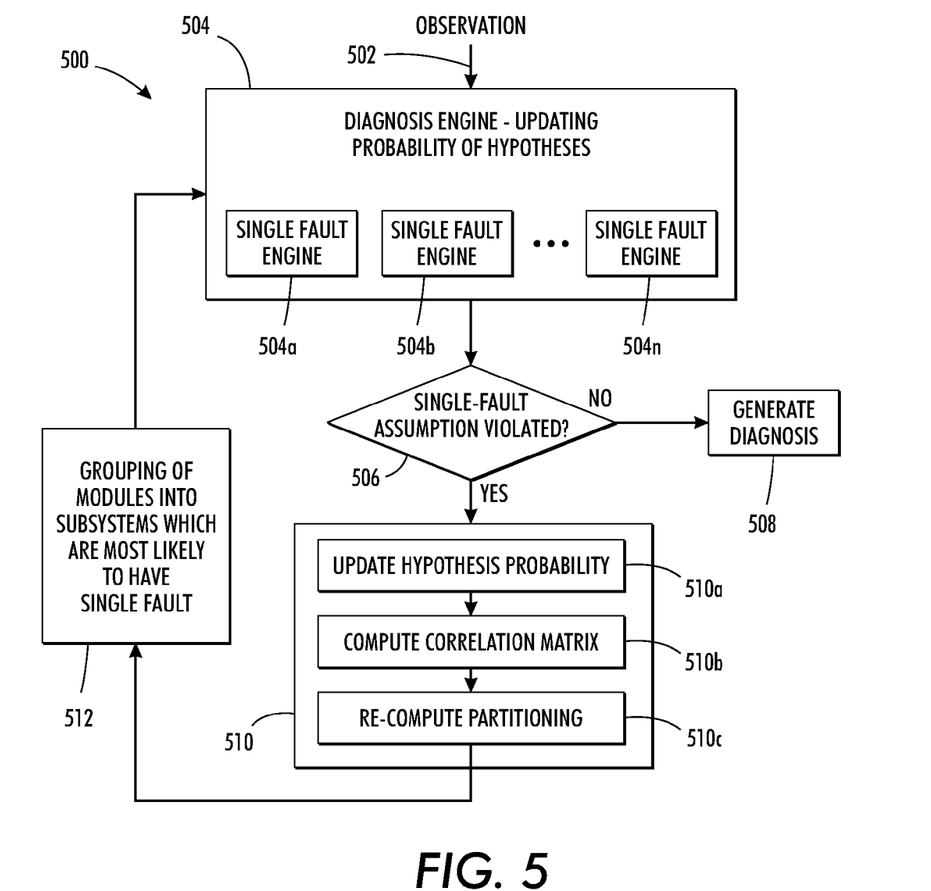
FIG. 5 is a top level flow diagram according to the present application.

Turning to FIG. 5, set forth is a high-level process flow in accordance with the concepts described in connection with the foregoing figures, and corresponding discussion.

More particularly, flow diagram 500 of FIG. 5 provides one embodiment of a high-level operation of flow in accordance with the present application. Observations 502 regarding the production system (e.g., 116 of FIG. 1) are supplied to a diagnosis engine for the updating a probability of hypotheses 504. The diagnosis engine may include a plurality of single-fault engines 504a-504n that may be used in the diagnostic process. The single-fault engines may be the same, or may be unique to each other. Also, these single-fault engines would be known to one of ordinary skill in the art. The single-fault engines 504a-504n are applied to determine whether the single-fault assumption of the existing hypotheses has been violated 506.

If this is not the case, the process will eventually generate an acceptable diagnosis for production system 508. If on the other hand at step 506 it is found a violation in the single-fault assumption has occurred, the process moves to a processing block 510 for further processing including updating the hypothesis probability 510a, computing a correlation matrix of the updated hypothesis 510b, and re-computing the partitioning of the representative production system modules 510c. The result of the partitioning 510c is a set of subgroups 512, where each subgroup is likely to contain at most a single fault. These new groupings are then processed by the diagnosis engine module 504, and the procedure continues. The following discussion will provide more detail as to the process described above. Such discussion including the concepts of generating a number of tiers which define different numbers of faults in the production system and moving to those higher fault tier levels when moving through the process.

4. Multiple Fault Diagnosis Algorithm

Figure 6:
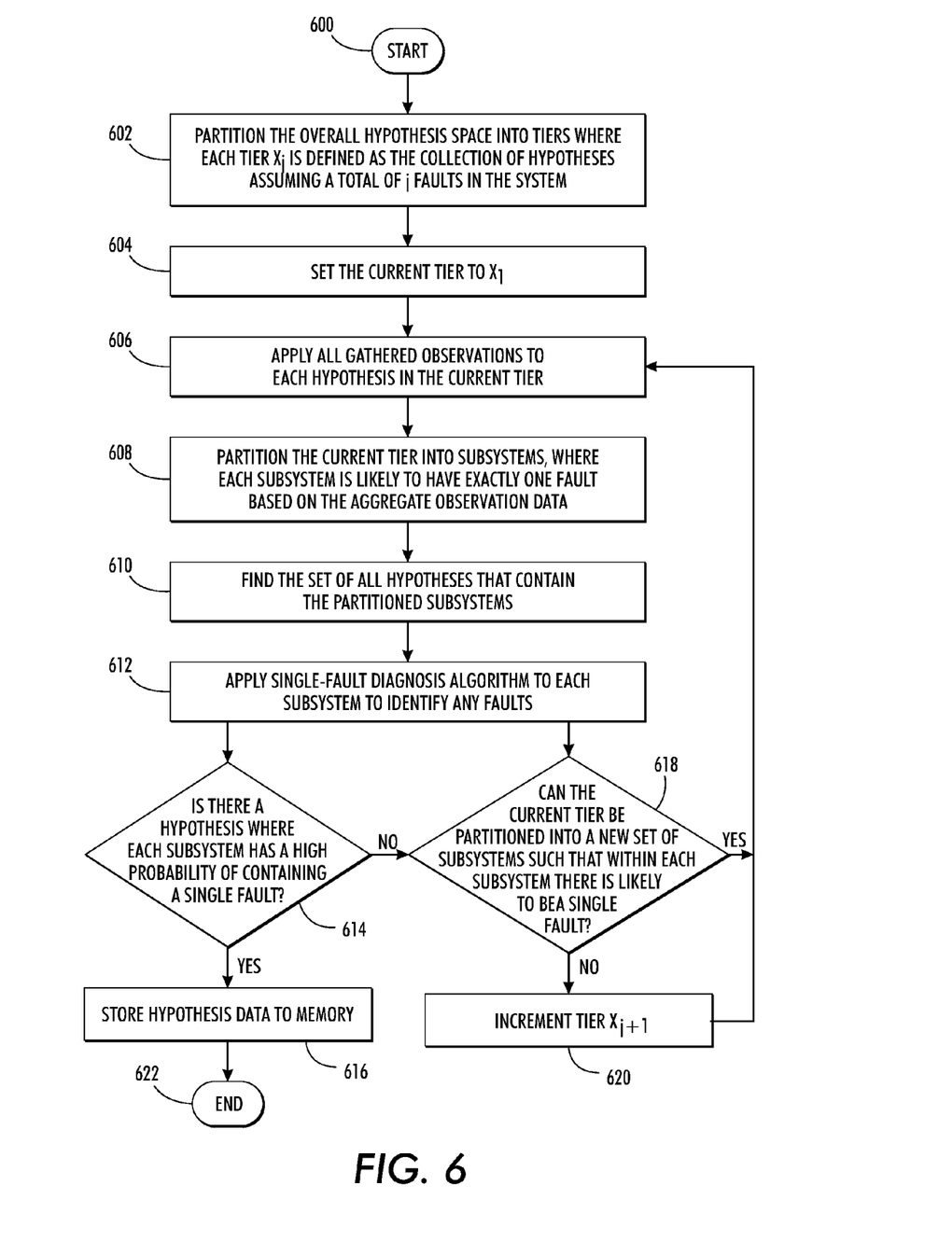
FIG. 6 is a flow diagram illustrating a method for tiered inference for multiple fault diagnosis.

With reference to FIG. 6, a more detailed exemplary method for tiered inference for multiple fault diagnosis is described. The method may be performed on the exemplary system detailed in FIGS. 1-5. The method begins at step 600.

At step 602, the overall hypothesis space $\chi$ (e.g., 200 of FIGS. 1 and 300 of FIG. 3) is partitioned into j tiers by the observation module 106, where each tier $\chi_j$ assumes a total of j faults in the system.

At step 604, the observation module 106 sets the current tier $\chi_j$ to $\chi_1$. In the exemplary embodiment, this is an initialization value so that a looping mechanism can begin at the next step 606.

At step 606, the observation module 106 applies all of the gathered observation data 112 produced by the production system 116 to each hypothesis in the current tier. In the exemplary embodiment, a Bayesian update is applied to each hypothesis.

At step 608, the dynamic partitioning module 108 uses the hypotheses of the current tier $\chi_j$ and their respective probabilities (updated in step 606) to partition the system components into j subsystems, where each subsystem is likely to have exactly one fault. More details with regard to step 606 are provided in FIG. 7.

At step 610, the dynamic partitioning module 108 finds all the hypotheses within the current tier that contain the partitioned subsystems as described with respect to FIG. 4 above. For example, suppose the current tier is $\chi_2$, that the system contains components {ABCD}, and it was determined in step 606 that subsystems AD and BC are the most likely to have exactly one fault. Then, the set of hypotheses that will be found by the dynamic partitioning module 108 are {0101}, {0011}, {1010}, and {1100} because each of these hypotheses suppose that each subsystem AD and BC contain exactly one fault.

At step 612, the single-fault diagnosis module 110 applies a single-fault diagnosis algorithm to each subsystem created by the dynamic partitioning module 108 in step 610. This can be performed with linear complexity, using any well-known single-fault diagnosis process.

At step 614, the single-fault diagnosis module 110 (or any other suitable module) determines whether any of the hypotheses in the set of hypotheses created in step 610 correlate with the results of the single-fault diagnosis algorithm. In other words, the single-fault diagnosis algorithm will determine whether each subsystem is likely to contain a single fault.

If it is determined that each and every subsystem is likely to contain a single fault, then the hypothesis containing the subsystems that match the results of the single-fault algorithm will be selected. Control will then be passed to step 616. Else, control will be passed to step 618.

At step 616, the multiple fault diagnosis system 100 stores the selected hypothesis data from step 614 to memory 102, 104.

At step 618, it has been determined that there is no hypothesis in the current tier where each subsystem has a high probability of containing a single fault. Thus, the dynamic partitioning module 108 attempts to re-partition the system into a new set of subsystems such that within each subsystem there is likely to be a single fault. Optionally, the dynamic partitioning module 108 may use any newly received observation data 112 in order to do the re-partitioning.

If it is determined that more partitions can be made by the dynamic partitioning module 108, then control is passed to step 606. Else, control is passed to 620.

At step 620, the current tier $\chi_j$ is incremented to tier $\chi_{j+1}$. Control is then passed to step 606.

The method ends at step 622. Optionally, the method may also terminate at the occurrence of one or more events, such as reaching a certain tier, or no more new observations exist.

5. The Partitioning Algorithm

The next issue is how to design the partitioning algorithm. The straightforward solution is to compare all partitions and see which partition captures the largest probability sum, but this is too expensive with complexity $2^M$. A more efficient computation is considered below. For simplicity, the case of partitioning a set into two groups is considered.

It is considered that for a group of modules to have a single fault, i.e., $\Sigma_{i \in P} x_i = 1$, the $x_i$'s would have to be negatively correlated.

In other words, when one member $x_i$ increases, there must be another $x_j$ which decreases in order to maintain the constant sum. This means that the process looks for modules with significant negative correlation and groups them together. In contrast, if two members are positively correlated, i.e., when one increases/decreases, the other one increases/decreases too, then these two modules should not be grouped into the same group.

Using these heuristics the described process examines the correlation coefficient between modules. The correlation coefficient is defined as:

$$\rho(i, j) \triangleq \frac{\text{Cov}(x_i, x_j)}{\sigma_i \sigma_j} = \frac{E[(x_i - \mu_i)(x_j - \mu_j)]}{\sigma_i \sigma_j}, \quad \text{Eqn. (4)}$$

where for any two modules i and j, $x_i$ and $x_j$ are the indicators of their respective health (0 if the module is good, and 1 if the module is bad), $\mu_i$ and $\mu_j$ are the respective mean of $x_i$ and $x_j$, a$\sigma_i$ and $\sigma_j$ are their respective standard deviations. The correlation coefficient $\eta(i,j)$ measures the dependency between $x_i$ and $x_j$, and has the following properties:
(a) $-1 \leq \eta \leq 1$;
(b) the sign of $\eta$ shows whether the two random variables are positively or negatively correlated;
(c) $\eta=1$ if $X_i=X_j$, and $\eta=-1$ if $x_i=-x_j$; and
(d) having a symmetry: $\eta(i,j)=\eta(j,i)$.

Using the above, and given a set of hypotheses $\{x\}$ and their respective probability values, one can easily compute the mean $\{\mu_i\}i=1, \ldots, M$, the standard deviation $\{\mu_i\}$, the covariance matrix $\{\text{Cov}(x_i, x_j)\}$ i,j=1, ..., M, and the correlation coefficient $\eta(i,j)$ for any i and j. By this arrangement, the computational complexity is linear in the number of hypotheses.

Figure 7:
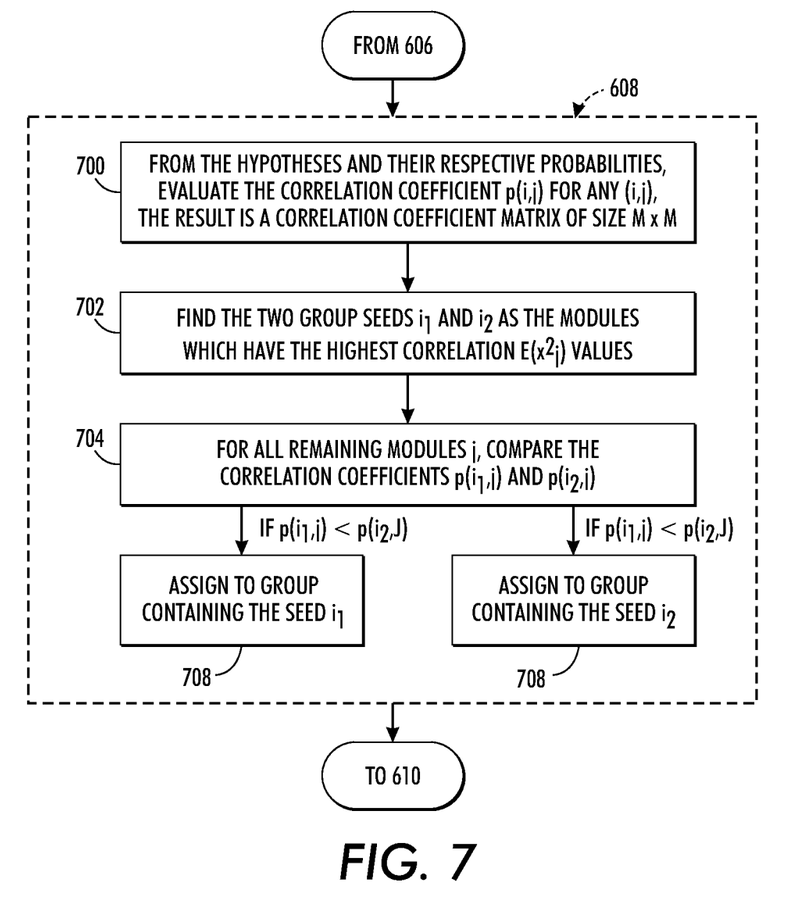
FIG. 7 is a flow diagram illustrating in more detail the dynamic partitioning algorithm contained in the method of FIG. 6.

FIG. 7 illustrates an exemplary embodiment of the partitioning algorithm. In the exemplary embodiment of FIG. 6, the partitioning method is contained within step 608. For illustrative purposes, the exemplary embodiment assumes that with respect to FIG. 6, control is passed from step 506 and the method begins at step 700.

At step 700, the dynamic partitioning module 108 uses the hypotheses of the current tier $\chi_j$ and their respective probabilities (updated in step 606) to compute the correlation coefficient $\eta(i,j)$ for every (i,j), where i and j are separate components of the production system 116 containing M components. The result of the computations is a correlation coefficient matrix of size M×M. Control is then passed to step 702.

At step 702, the dynamic partitioning module 108 seeds each component subsystem. Assuming that there are going to be two subsystems, the dynamic partitioning module 108 finds the modules $i_1$, $i_2$ that have the highest autocorrelation $E(x_i^2)$ values. This indicates that the selected modules are more likely to have a fault than the non-selected modules. In the case of a tie, seeds may be picked randomly. The groups of components which will make up the subsystems "grow" around the seeds. Control is then passed to step 704.

At step 704, the dynamic partitioning module 108 compares the remaining modules against each seed module. I.e., for any remaining module j, the correlation coefficients $\eta(i_1,j)$ and $\eta(i_2,j)$ are compared. If $\eta(i_1,j)<\eta(i_2,j)$, then control is passed to step 606, otherwise control is passed to step 608. The module is assigned to group 1 if $\eta(i_1,j) \leq \eta(i_2,j)$ and to group 2 if otherwise.

At step 706, the dynamic partitioning module 108 assigns module j to the first subsystem.

At step 708, the dynamic partitioning module 108 assigns module j to the second subsystem.

Control is then passed to step 610 of FIG. 6.

6. Computational Complexity And Performance

The computation is primarily on the computation of $\{\eta(i,j)\}$. The complexity is $O(M^2 \cdot |\# \text{ of hypotheses}|)$ as there are $M^2$ correlation coefficients, and computing each need to go through all hypotheses in the current tier. In contrast, the "oracle" scheme of comparing all partitioning combinations has complexity $O(2^M \cdot |\# \text{ of hypotheses}|)$.

Despite its simplicity, this greedy algorithm works well. In one test, a large number (e.g., 100) of random simulations compared this partitioning scheme against the enumeration of $2^M$ possible partitions. It was found that the exemplary partition selection scheme has the following performance characteristics:

(i) Against the missing probability metric: the exemplary partition selection method is at about the 85% percentile among all $2_M$ partitions, i.e., around 15% partitions are better than the exemplary solution, and 85% are worse. However, the computational complexity is much less.

(ii) Compared to the "oracle"—the partition with smallest missing probability, the exemplary partition scheme produces a slightly larger missing probability, on average 3-5% larger.

7. Partitioning Example

Consider a production system, where raw material is transported through a sequence of modules (known as an "itinerary") and modified to produce a product. At the end of an itinerary, one observes a good product or a damaged product. The product is damaged if any of the modules in the itinerary malfunctions. Furthermore, damage caused by a defective module cannot be repaired by subsequent modules. In this paradigm, diagnosis aims at isolating broken modules based on the itineraries and observed output. For this diagnosis problem, the tradeoff between computational cost and inference accuracy is analyzed. While production plant diagnosis is used as an illustration, the ideas presented here are more general and can be extended to other diagnosis problems.

Consider a 5-module production system (ABCDE), with the following observations: (1) observing a fault with the module set (ABCDE); (2) observing a fault with module set (ABC); and (3) observing a fault with module set (DE). At this point, the single fault assumptions are eliminated. The example assumes that each module is defective with a prior probability r=0.1, and that all faults are persistent. In this case, the covariance coefficient matrix is:

$$\rho = \begin{pmatrix} 1 & -0.5 & -0.5 & 0 & 0 \\ -0.5 & 1 & -0.5 & 0 & 0 \\ -0.5 & -0.5 & 1 & 0 & 0 \\ 0 & 0 & 0 & 1 & -1 \\ 0 & 0 & 0 & -1 & 1 \end{pmatrix} \quad \text{Eqn. (5)}$$

The partitioning algorithm selects B and D as group seeds and partitions modules into two subsystems (ABC) and (DE), which agrees with the partitioning method described above.

The process above includes the computation of correlation coefficients $\{p(i,j)\}i,j=1, 2, \ldots, M$. They are computed based on a set of hypotheses and their respective probability values. While this hypothesis set may be the entire hypothesis space ($\chi$, size $2^M$) the process may work on a smaller subset. It is considered, therefore, that it is sufficient to compute the distribution for a subset. For instance, if the first tier (the single fault hypotheses tier $\chi_1$) is ruled out, and the algorithm must escalate to double faults, the algorithm only needs to examine the double fault hypothesis tier $\chi_2$, since other hypotheses are out of the representation of two-group partition anyway. Therefore the other hypotheses will not be covered by the partitioning. In the tiered inference framework, tier $\chi_2$ is used for partitioning into two groups. Likewise, if $\chi_2$ is ruled out by observations, the algorithm escalates to the triple-fault tier $\chi_3$, and partitions the M-module system into three groups. The partitioning is computed based on the probability values of all hypotheses in $\chi_3$.

The process described above can be modified to partitioning components into any number of groups. The extension is straightforward by just selecting more group seeds in step 602, and letting the seeds grow into groups.

As an example to illustrate the concepts of the present tiered inference approach, the diagnosis of a production plant is considered. It is assumed that modules are independent, and each module is defective with a known prior probability r. All faults are intermittent, i.e., a defective module damages any product passing it with a known probability q, known as the intermittency probability. In practice, each module may have its own r and q, different from the others. In this implementation, for simplicity, it is assumed that all modules share the same r and q value. Mathematically, the prior probability is:

$$p(x) = (r \Sigma_i^{x_i}) \cdot ((1-r)^{M-\Sigma_i x_i}).$$

Given an itinerary w, the likelihood of observing an output O (0 for good, and 1 for damaged) is:

$$p(o \mid x) = \begin{cases} (1-q)^{k(w,x)} & \text{if } o = 0 \\ 1 - (1-q)^{k(w,x)} & \text{if } o = 1. \end{cases}$$

Here the exponent k (w,x) is the number of defective modules involved in the production itinerary w given the hypothesis x. This is actually quite intuitive, since a product is undamaged only when none of the defective modules malfunctions, hence the probability is the module-wise good probability (1−q) raised to the power k(w,x).

Now with prior and likelihood probabilities specified, Bayesian updates (e.g., Eqn. 1) are performed.

Now, two diagnosis schemes are compared: (a) a baseline scheme applying all observations sequentially to update the posterior belief p(x|o) for all X$\delta\chi$ that has not been ruled out by previous observation data; and (b) the tiered inference scheme described above. To evaluate the performance, 300 random trials were simulated, each with an observation sequence of 400 randomly generated production itineraries and corresponding outputs. Performance is assessed based on cost and accuracy:

(i) Computational cost: for the baseline scheme, computational cost is measured as the accumulative number of posterior updates, i.e., how many times Eqn. (1) is executed. For tiered inference, the cost is the sum of two parts: (i) the inference cost, i.e., the number of posterior updates, and (ii) the overhead cost of partitioning modules into subsystems, measured as the number of hypotheses sieved through to compute the correlation coefficient (Eqn. 4). Table 1 reports the two terms, separated by a ";" in the third column.

(ii) Diagnosis accuracy is measured as the total number of bits that $x_{MAP}$ differ from the ground truth. Ideally, if $x_{MAP}$ recovers the ground truth, this term should be 0. However, this is often not achieved, even in the baseline inference scheme. This is due to the fact that the observations may not be sufficient. For instance, if some defective modules are never used in production, and/or the faults are intermittent, the defects are never observed.

TABLE 1

Tradeoff between computational cost and diagnosis accuracy

| | Computation cost | | Diagnosis accuracy | |
|---|---|---|---|---|
| | baseline | tiered | baseline | tiered |
| r = 0.05 | 285779.7 | 2268.5; 63.3 | 0.03 | 0.03 |
| r = 0.1 | 265003.1 | 2051.9; 448.3 | 0.17 | 0.13 |
| r = 0.2 | 236468.3 | 2705.2; 1435.7 | 0.47 | 0.59 |
| r = 0.5 | 175757.8 | 6293.7; 4610.0 | 1.51 | 2.36 |
| r = 0.9 | 141973.8 | 7875.2; 6470.0 | 1.16 | 5.07 |

Table 1 reports the results for a 10-module production system, averaged over 300 random trials. Each row corresponds to a value of r, ranging from 0.05 to 0.9. Small r implies a healthy system, while r=0.9 corresponds to an extremely shaky system where all modules are likely to fail. Extreme cases are used to provide insights. For example, it has been observed:

(1) The computational cost saving using the tiered inference scheme is significant. For instance, with r=0.05, the tiered inference scheme has a computation cost less than 1% of the baseline scheme. With r=0.9, the tiered inference computation is around 10% of the baseline computation.

(2) The baseline scheme is on average more accurate than the tiered inference. This is expected, since the tiered inference is an approximation.

(3) Tiered inference is most advantageous when r is small. The inference accuracy is almost as good as the baseline scheme for r≦0.2, and the computation cost is one to two magnitudes order lower. This shows the benefit of tiered inference. The good performance is not surprising, as a system with small r is what tiered inference was originally designed to handle.

(4) As r increases, tiered inference incurs a increasingly heavy partitioning overhead cost (second number in the third column). This is due to the fact that the system has more defective modules, and the single-fault assumption within subsystems is often ruled out by observation data. In this case, the partitioning operations are frequently repeated. The overhead cost makes computational savings less dramatic. Furthermore, tiered inference becomes less accurate.

For instance, in the last row (r=0.9), the tiered inference diagnosis has roughly five bits flipped. It fails to detect five defective modules. In comparison, the baseline has 1.16 bits flipped on average. Note that this is due to their different strategies: the baseline scheme seeks exact inference and optimal diagnosis, while tiered inference favors low-cardinality diagnosis. Tiered inference stays at lower tiers as long as the lower tiers can explain the data. This is similar to a minimal diagnosis: the minimal candidate set can be quite different from the underlying ground truth, especially when the faults are intermittent and the number of observations are limited. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer implemented method for multiple fault diagnosis comprising:
   organizing a hypothesis space into tiers of hypotheses, wherein each tier represents a different number of faults in a production system having a plurality of production system modules and each hypothesis of the hypothesis space includes a representation of a fault presence for each of the plurality of production system modules;
   performing single-fault diagnosis on a single fault tier of the organized tiers of hypotheses; and
   storing hypotheses from the single fault tier corresponding to an acceptable fault diagnosis and a corresponding probability;
   wherein the method is performed by use of at least one computer processor.

2. The method of claim 1, further comprising:
   partitioning a second tier which includes hypotheses with two faults from the organized tiers into two groups based on a corresponding grouping of the plurality of production system modules, wherein each corresponding group of the production system modules is likely have a single fault;
   performing single-fault diagnosis on the each group of the second tier; and
   storing in a computer memory hypotheses from the second tier corresponding to an acceptable fault diagnosis and a corresponding probability.

3. The method according to claim 2, further including:
   partitioning a next tier which includes a number of incremental faults and with a number of partitions corresponding to the number of incremental faults; and
   performing single fault diagnosis on the partitioned next tier; and
   storing in a memory hypotheses from the next tier corresponding to an acceptable fault diagnosis and a corresponding probability.

4. The method according to claim 1, wherein the stored probability is calculated using observation data from the production system.

5. A computer-implemented method for tiered inference multiple fault diagnosis, comprising:
   organizing a hypothesis space into tiers, wherein each hypothesis of the hypothesis space identifies potential component faults in a production system, and each tier includes hypotheses with a same number of potential component faults;
   performing diagnosis on each tier from a lowest same number of potential faults in order, ruling each tier out based on observation data until a tier is not completely ruled out;
   partitioning the tier into sets based on subsystems of the production system, and the sets correspond to subsystems likely to have single faults;
   applying a single-fault diagnosis algorithm to each subsystem corresponding to the partitioned sets which identifies any probable faults within each subsystem and identifies corresponding hypotheses; and
      storing the identified hypotheses into computer memory;
   wherein the method is performed by use of at least one computer processor.

6. The method of claim 5, wherein each tier is partitioned into a number of groups and the number of groups corresponds to the same number of potential faults for each tier.

7. The method of claim 5, wherein the hypothesis space is organized into j tiers where each tier $\chi_j$ is defined as a collection of hypotheses, each hypothesis of the collection with a total of j faults.

8. The method of claim 5, wherein the tier is partitioned into groups corresponding to subsystems where each subsystem is likely to have at most one fault based on the observation data from the production system.

9. The method of claim 5, wherein the tier is partitioned into groups corresponding to subsystems where each subsystem is likely to have at most one fault based on an aggregate of all observation data from the production system.

10. The method of claim 5, wherein steps terminate when at least one of the following conditions occur:
    the diagnosed each tier reaches a predetermined tier; or
    a predetermined amount of time elapses.

11. The method of claim 5, wherein a complexity of the method is $O(M^2)$, wherein $O(\ )$ is a standard complexity notation which means "in the order of", and wherein $M^2$ means a computation complexity is in an order of M×M.

12. The method of claim 5 wherein each hypothesis is represented as a bit vector containing M bits;
    where M is a number of components in the production system, and
    each component in the production system is represented in the bit vector by a bit indicating whether a component is considered faulty.

13. A computer-implemented method for partitioning a system into subsystems, comprising:
    storing in a computer memory:
    a set of hypotheses and each hypothesis of the set includes a correspondence to each component in the system
    a probability for each hypothesis of the set that each hypothesis contains a fault; and
    a number j of expected faults;
    for each component, calculating a correlation coefficient between the each component and every other component;
    using a computer processor, selecting j components having a highest correlation coefficient as seed values for a set of j subsystems and assigning each selected component to a subsystem of a set of j subsystems;

assigning each component not selected to one of the set of j subsystems based on the calculated correlation coefficients; and storing hypotheses of the set of hypotheses corresponding to the set of j subsystems to the computer memory.

14. The method of claim 13, wherein the set of j subsystems are single-fault subsystems.

15. The method of claim 13, wherein the probability for each hypothesis is calculated using observation data from the system.

16. The method of claim 13, wherein the probability for each hypothesis is calculated at least in part by using a Bayesian rule.

17. The method of claim 13, wherein each hypothesis is represented as a bit vector containing M bits;
where M is a number of components in the system, and each component in the system is represented in the bit vector by one bit indicating whether the each component is considered faulty.

18. A computer-based system for tiered inference multiple fault diagnosis, comprising:
(i) an observation module configured to:
  receive observation data from a production system which includes a plurality of components; and
  update probabilities for a hypothesis space based on the received observation data, where each hypothesis of the hypothesis space identifies potential component faults in the production system;
(ii) a dynamic partitioning module configured to:
  partition the hypothesis space into tiers; and
  partition the production systems into a set of subsystems where each subsystem is likely to contain at most a single fault;
(iii) a single fault diagnosis module configured to:
  apply a single-fault diagnosis algorithm to each subsystem in the set of subsystems to identify any probable faults within each subsystem; and
  if the single-fault diagnosis algorithm determines that each subsystem contains a probable single fault, then perform the following:
    identify hypotheses of the hypothesis space that correspond to each subsystem containing the probable single faults; and
    store the identified hypotheses into computer memory.

19. The system of claim 18, wherein the hypothesis space is partitioned into j tiers where each tier $x_j$ is defined as a collection of hypotheses of the hypothesis space, each tier including the hypotheses with a total of j faults in the system.

20. The system of claim 18, wherein each subsystem is likely to have at most one fault based on the received observation data.

21. The system of claim 18, wherein an overall complexity of the method performed is $O(M^2)$, wherein $O(\ )$ is a standard complexity notation which means "in the order of", and wherein $M^2$ means a computation complexity is in an order of $M \times M$.

22. The system of claim 18, wherein each hypothesis is represented as a bit vector containing M bits;
where M is a number of components in the production system, and each component in the production system is represented in the bit vector by one bit indicating whether a component is considered faulty.

23. The system of claim 18, wherein the dynamic partitioning module is further configured to: store the following to computer memory:
the hypotheses space;
the updated probabilities; and
a number j of expected faults;
calculating a correlation coefficient between each component and every other component;
using a computer processor, selecting j components having a highest correlation coefficients as seed values for a set of j subsystems and assigning each of the selected j components to one of the set of j subsystems;
assigning each of the components not selected to one of the subsystems based on the calculated correlation coefficients; and
storing the hypotheses of the hypothesis space corresponding to the assigned subsystems to computer memory.

24. The system of claim 23, wherein the probability for each hypothesis contains a fault is calculated at least in part by using a Bayesian equation.

* * * * *